US008805392B2

(12) United States Patent
Lu et al.

(10) Patent No.: US 8,805,392 B2
(45) Date of Patent: Aug. 12, 2014

(54) METHOD AND SYSTEM FOR SYNCHRONIZING USER DATA

(75) Inventors: Fei Lu, Shenzhen (CN); Shuang Liang, Shenzhen (CN); Chunhui Zhu, Shenzhen (CN); Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 127 days.

(21) Appl. No.: 13/522,336

(22) PCT Filed: Sep. 20, 2010

(86) PCT No.: PCT/CN2010/077149
§ 371 (c)(1),
(2), (4) Date: Jul. 16, 2012

(87) PCT Pub. No.: WO2011/153750
PCT Pub. Date: Dec. 15, 2011

(65) Prior Publication Data

US 2012/0282941 A1 Nov. 8, 2012

(30) Foreign Application Priority Data

Jun. 12, 2010 (CN) .......................... 2010 1 0206691

(51) Int. Cl.
*H04W 72/00* (2009.01)
*H04W 48/20* (2009.01)
*H04W 8/20* (2009.01)

(52) U.S. Cl.
CPC ................ *H04W 48/20* (2013.01); *H04W 8/20* (2013.01)
USPC ........ 455/452.1; 455/450; 455/436; 455/442; 455/432.3; 455/432.1; 455/435.1; 455/422.1; 370/331

(58) Field of Classification Search
CPC .... H04W 24/00; H04W 72/082; H04W 16/10
USPC ........ 455/452.1, 450, 436, 442, 432.3, 435.1, 455/432.1, 422.1; 370/331
See application file for complete search history.

(56) References Cited

U.S. PATENT DOCUMENTS

2009/0129342 A1* 5/2009 Hwang et al. ................ 370/331
2011/0021194 A1 1/2011 Gustafsson

FOREIGN PATENT DOCUMENTS

CN 101494853 A 7/2009
CN 101600192 A 12/2009
CN 101626566 A 1/2010
WO 2009118071 A1 10/2009

OTHER PUBLICATIONS

International Search Report in international application No. PCT/CN2010/077149, mailed on Mar. 17, 2011.
English Translation of the Written Opinion of the International Search Authority in international application No. PCT/CN2010/077149, mailed on Mar. 17, 2011.

* cited by examiner

*Primary Examiner* — Nghi H Ly
(74) *Attorney, Agent, or Firm* — Oppedahl Patent Law Firm LLC

(57) ABSTRACT

A method for synchronizing user data is provided, which includes: when a User Equipment (UE) moves into a coverage area of a new mobility management unit, an old mobility management unit sends an indication of whether a bearer modification procedure is to be triggered to the new mobility management unit, and the new mobility management unit determines whether to trigger the bearer modification procedure according to the indication. A system for synchronizing user data is further provided. By means of the technical solution of the method and the system, the situation that a Quality of Service (QoS) used by a bearer in the new mobility management unit does not match with a bearer QoS of an updated subscription data when a user equipment moves into a coverage area of a new mobility management unit can be avoided.

10 Claims, 5 Drawing Sheets

UE
eNodeB
MME
SGSN
S-GW
P-GW
HSS
201: Tracking Area Update (TAU) request
202: context request
203: context response
204: context confirmation
205: update bearer request
206: update bearer request
207: update bearer response
208: update bearer response
209: location update
210: location cancel
211: location cancel response
212: location update confirmation
213: TAU accept
214: TAU complete

METHOD AND SYSTEM FOR SYNCHRONIZING USER DATA

TECHNICAL FIELD

The disclosure relates to the field of communications, and in particular to a method and a system for synchronizing user data.

BACKGROUND

With the sudden appearance of a World Interoperability for Microwave Access (WiMax) technology, the third generation mobile communication system must improve its own network performance and reduce the cost of network construction and operation, in order to keep the competitiveness of itself in the field of mobile communication. Therefore, the standardization work group of the 3rd Generation Partnership Project (3GPP) is committed to studying the evolution of a Packet Switch Core (PS Core) and a Universal Mobile Telecommunication System Radio Access Network (UTRAN) at present. This research subject is called a System Architecture Evolution (SAE), with the purpose of enabling an Evolved Packet Core (EPC) to provide a higher transmission is rate and a shorter transmission delay, optimize grouping and support the mobility management among an Evolved Universal Terrestrial Radio Access Network (E-UTRAN), a Universal Terrestrial Radio Access Network (UTRAN), a Wireless Local Area Network (WLAN) and other non-3GPP access network.

At present, the architecture of the SAE is as shown in FIG. 1, wherein a network element contained in the Evolved Radio Access Network (E-RAN) is an Evolved NodeB (eNodeB) which is used for providing radio resource to the access of a user; a Packet Data Network (PDN) is a network for providing service for a user; the EPC provides a lower delay and allows more radio access systems to access, including the following network elements:

Mobility Management Entity (MME): a control plane function entity, which is a server for temporarily storing user data, taking charge of managing and storing the context of a User Equipment (UE) (for example, UE/user identification, mobility management state, user safety parameter and on the like), allocating a temporary identification to a user, and authenticating the user when the UE is stationed in the tracking area or the network; processing all non-access stratum messages between the MME and the UE; and triggering a paging in the SAE. The MME is a mobility management unit of an SAE system; in a Universal Mobile Telecommunications System (UMTS), the mobility management unit is a Serving General Packet Radio Service (GPRS) Support Node (SGSN);

Serving Gateway (S-GW), which is a user plane entity, takes charge of user plane data routing processing, terminates downlink data of a UE in an idle (ECM_IDLE) state, manages and stores an SAE bearer context of a UE, such as an IP bearer service parameter and internal network routing information; the S-GW is an anchor point of the user plane inside the 3GPP system and a user can only have one S-GW at each moment;

PDN Gateway (P-GW), which is a gateway for taking charge of a UE accessing to a PDN, allocates a user IP address and also is a mobility anchor point of the 3GPP and non-3GPP access systems, wherein the function of the P-GW further includes policy enforcement and charging support; a user can access to a plurality of P-GWs at the same moment; and a Policy and Charging Enforcement Function (PCEF) entity also is is located in the P-GW;

Policy and Charging Rules Function (PCRF) entity, which takes charge of providing policy control and charging rules for the PCEF; and Home Subscriber Server (HSS), which permanently stores user subscription data, wherein the content stored in the HSS includes an International Mobile Subscriber Identification (IMSI) of a UE and an IP address of the P-GW.

Physically, the S-GW and the P-GW may be combined, and user plane network elements of an EPC system include the S-GW and the P-GW.

When the coverage area in which the UE is located is changed, for example, the UE moves from a Radio Access Technology (RAT) coverage area to another RAT coverage area, the UE finds that the UE enters an unregistered area by monitoring a broadcast channel; in order to guarantee the service continuity between the UE and the core network, the UE needs to register in the new RAT coverage area; therefore, the UE would initiate a Tracking Area Update (TAU) or Routing Area Update (RAU) procedure accessing to the RAT. FIG. 2 shows a TAU procedure caused when a UE registering in a UTRAN coverage area moves into an E-UTRAN coverage area. The RAU procedure caused when a UE registering in an E-UTRAN coverage area moves into a UTRAN coverage is similar to FIG. 2. As shown in FIG. 2, the flow mainly includes the following steps.

Step 201: a UE moves into an E-UTRAN coverage area of an MME, sends a TAU request to the MME and requests to register in a new area, wherein a Packet-Temporary Mobile Subscriber Identity (P-TMSI) allocated to the UE by an SGSN is carried in the request message;

Step 202: the new MME finds an old SGSN according to the P-TMSI, and sends a context request signaling to the old SGSN to perform a context acquisition process;

Step 203: the old SGSN sends mobile management and bearer information of the user to the new MME, i.e., performs a context response;

Step 204: the new MME confirms the context after receiving the context response;

Step 205: the new MME initiates an update bearer request to an S-GW, wherein a source CPRS Tunneling Protocol-Control plane (GTP-C) tunnel identifier, a target GTP-C tunnel identifier and a binding relationship of S-GW update bearer are carried in the request message;

Step 206: the S-GW sends an update bearer request to the P-GW to transmit is address information and tunnel identifier information of the S-GW, access technology type and other parameter to the P-GW;

Step 207: the P-GW updates its own context and returns an update bearer response message to the S-GW, wherein the content of the response message includes the address, the tunnel identifier of the P-GW and the like;

Step 208: the S-GW returns an update bearer response to the new MME to bring to the MME the target GTP-C tunnel identifier designated by the S-GW, the address of the S-GW itself, and the address and tunnel information of the P-GW and the like;

Step 209: the new MME notifies an HSS of the change of a registration location through a location update message;

Step 210: the HSS keeps a single registration principle for the UE, sends a location cancel signaling to the old SGSN, and only maintains the registration of the new MME;

Step 211: the old SGSN returns a location cancel response to the HSS;

Step 212: the HSS confirms location update of the new MEE;

Step 213: if the new MME confirms that the UE is valid within a current tracking area, the new MME sends a TAU accept message to the UE;

Step 214: if the new MME allocates a new Globally Unique Temporary Identity (GUTI) to the UE through the TAU procedure, the UE would return a TAU complete message to the MME to confirm.

Based on a location update principle, if a UE moves frequently between a UTRAN coverage area and an E-UTRAN coverage area, or a frequent registration area selection is caused due to a signal intensity or the like in the same coverage area, a large number of TAU or RAU procedures will be caused, which may bring a heavy burden to an air interface. Therefore, in an EPS system, a function of Idle mode Signaling Reduction (ISR) is introduced to reduce an idle mode signaling between the UE and the core network. After the function is activated, the UE simultaneously having UTRAN and E-URTAN access functions can be registered into the MME and SGSN at the same time. In this way, when the UE moves frequently between coverage areas corresponding to two different access technologies, the UE will not initiate a TAU or RAU procedure accessing through the RAT, thereby reducing transmission of an unnecessary idle mode signaling.

The process of the UE activating the ISR is completed through the TAU or RAU procedure; however, some steps are different. The differences of the above two procedures are illustrated by taking the process of activating the ISR function through the TAU procedure for example, and the process of activating the ISR function through the RAU procedure is similar to the process of activating the ISR function through the TAU procedure. As shown in FIG. 3, the flow mainly includes the following steps.

Step 301: an UE moves into an E-UTRAN coverage area of an MME, and sends to the MME a TAU request message in which an P-TMSI of the UE allocated by an SGSN and information of whether the UE has a capability of supporting the ISR function are carried;

Step 302: a new MME finds an old SGSN according to the P-TMSI and sends a context request signaling to the old SGSN to perform a context acquisition process;

Step 303: the old SGSN sends mobile management and bearer information of the user to the new MME, and carries information of whether the old SGSN has a capability of supporting the ISR function in a returned context response message;

Step 304: the new MME judges whether to activate an ISR function according to the context information received from the old SGSN, if activating the ISR function, the new MME carries an ISR indication in a context confirmation message returned to the old SGSN, to notify the old SGSN of reserving the original context information of the UE;

Step 305: the new MME initiates an update bearer request to the S-GW, wherein a source GTP-C tunnel identifier, a target GTP-C tunnel identifier and a binding relationship of an S-GW update bearer are carried in the request message, and an indication of activating the ISR function for notifying the S-GW of reserving the bearer context information possessed by the UE at the old SGSN is further included in the update bearer request message;

Step 306: since the RAT is changed, the S-GW sends an update bearer request to the P-GW;

Step 307: the P-GW updates its own context and returns update bearer response information to the S-GW;

Step 308: the S-GW returns an update bearer response to the new MME, so as to bring to the MME the target GTP-C tunnel identifier designated by the S-GW, the address of the S-GW itself, and the address and tunnel information of the P-GW and the is like;

Step 309: the new MME notifies an HSS of the change of location through a location update message, and notifies the HSS of information of activation of the ISR function through a corresponding identification, then the HSS keeps double-registration information of the E-UTRAN and the UTRAN, and does not send location cancel information to the old SGSN again;

wherein, the above corresponding identification information is indicated as double-registration through the present location update type message unit at present;

Step 310: the HSS judges whether the UE activates the ISR function, if the HSS does not keep the double-registration for the UE, the HSS sends a location cancel signaling to the SGSN; if the UE activates the ISR, the HSS keeps the registrations of two PS domains for the UE, and thus does not send a location cancel signaling to the SGSN; in the flow, it belongs to the latter case;

Step 311: if the SGSN receives the location cancel signaling, the SGSN returns a location cancel response to the SGSN; corresponding to the latter case in Step 310, the SGSN does not need to return the location cancel response;

Step 312: the HSS confirms location update of the new MME;

Step 313: if the new MME confirms that the UE is valid within a current tracking area, the new MEE sends a TAU accept message to the UE; in the TAU accept message, the MME notifies the UE that the ISR function is activated through an indication; and Step 314: if the new MME allocates a new GUTI to the UE through the TAU process, the UE would return a TAU complete message to the MME to confirm.

When the ISR function is activated, both the SGSN and the MME connected to the user need to be registered in the HSS; therefore, when user data in the HSS are changed, the HSS needs to send updated user data to the SGSN and the MME. When the UE is in an idle state at both the MME and the SGSN, after the MME and the SGSN receive new user data, the MME and the SGSN initiate the bearer modification procedure after the user enters the connected state. However, if the UE enters a coverage area of a new MME or SGSN due to movement, the new MME or the SGSN can not determine whether to need to initiate a bearer modification procedure after obtaining user subscription data; in this way, a Quality of Service (QoS) used by a bearer in the new MME or SGSN does not match with a bearer QoS of an updated subscription data.

SUMMARY

In view of the above problem, the main purpose of the disclosure is to provide a method and a system for synchronizing user data, so as to avoid the situation that a QoS used by a bearer in the new mobility management unit does not match with a bearer QoS of an updated subscription data when a UE moves into a new mobility management unit.

In order to achieve the above purpose, the technical solution of the disclosure is realized as follows.

The disclosure provides a method for synchronizing user data, which includes:

when a User Equipment (UE) moves into a coverage area of a new mobility management unit, an old mobility management unit sends an indication of whether a bearer modification procedure is to be triggered to the new mobility management unit; and the new mobility management unit determines whether to trigger the bearer modification procedure according to the indication.

The method may further include: when the UE moves into the coverage area of the new mobility management unit, the old mobility management unit sends an indication of whether the bearer modification procedure is to be triggered to the new mobility management unit during a context transferring process.

The method may further include: before the UE moves into the coverage area of the new mobility management unit, when user subscription data of the UE at the old mobility management unit and in an idle state are changed and a related activated bearer modification is to be triggered, the old mobility management unit only stores the updated user subscription data and records an identification to indicate that the bearer modification procedure is triggered when the UE enters a connected state.

The method may further include: when the new mobility management unit determines to trigger the bearer modification procedure according to the indication, the new mobility management unit triggers the bearer modification procedure after obtaining is the updated user subscription data.

The mobility management unit may be: a Mobility Management Entity (MME) or a Serving General Packet Radio Service (GPRS) Support Node (SGSN).

The disclosure further provides a system for synchronizing user data, which includes an old mobility management unit and a new mobility management unit, wherein the old mobility management unit is configured, when a UE moves into a coverage area of the new mobility management unit, to send an indication of whether a bearer modification procedure is to be triggered to the new mobility management unit; and the new mobility management unit is configured to determine whether to trigger the bearer modification procedure according to the indication.

The old mobility management unit may be further configured, when the UE moves into the coverage area of the new mobility management unit, to send the indication of whether the bearer modification procedure is to be triggered to the new mobility management unit during a context transferring process.

The old mobility management unit may be further configured, when the user subscription data of the UE at the old mobility management unit and in an idle state are changed and a related activated bearer modification is to be triggered, to store only updated user subscription data and to record an identification to indicate that the bearer modification procedure is triggered when the UE enters a connected state.

The new mobility management unit may be further configured, when determining to trigger the bearer modification procedure according to the indication, to trigger the bearer modification procedure after obtaining the updated user subscription data.

The mobility management unit may be: an MME or an SGSN.

By means of the method and the system for the synchronizing user data provided by the disclosure, when a UE moves into a coverage area of a new mobility management unit, an old mobility management unit sends an indication of a bearer modification procedure is to be triggered to the new mobility management unit, and the new mobility management unit determines whether to trigger the bearer modification procedure according to the indication. By means of the disclosure, the situation that a QoS used by a bearer in the new mobility management unit does not match with a bearer QoS of an updated subscription data when a UE moves into a coverage area of a new mobility management unit can be avoided.

DETAILED DESCRIPTION

The technical solution of the disclosure will be further illustrated in conjunction with the drawings and specific embodiments hereinafter.

Figure 1:
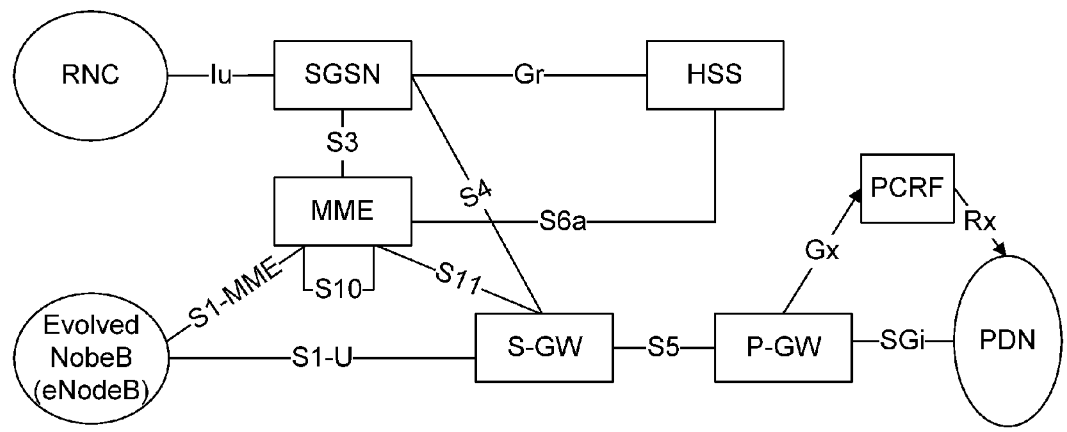
FIG. 1 shows a structure diagram of an evolved packet network system in the related art.
Figure 2:
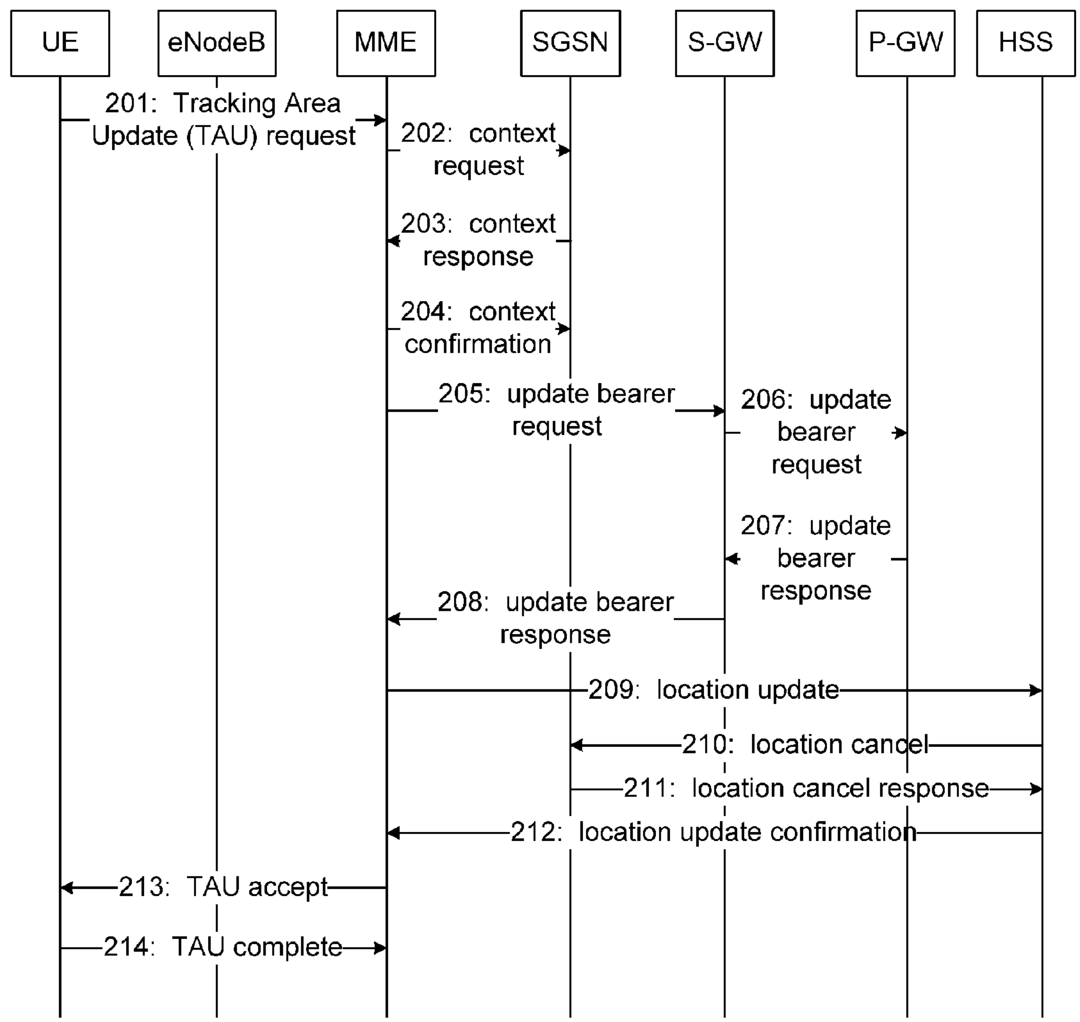
FIG. 2 shows a signaling flowchart of performing normal Tracking Area Update (TAU) in the related art.
Figure 3:
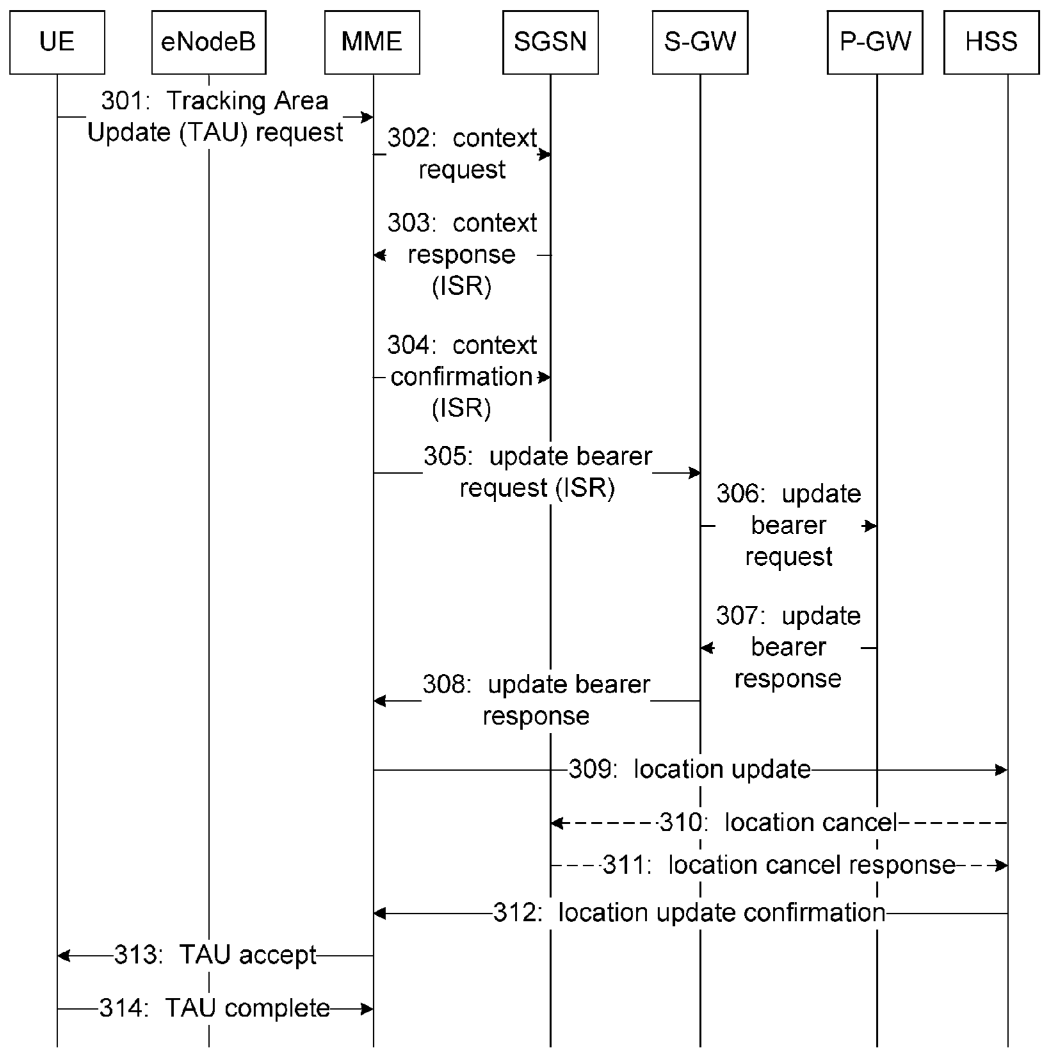
FIG. 3 shows a signaling flowchart of activating an idle mode Signaling Reduction (ISR) function through a TAU process in the related art.
Figure 4:
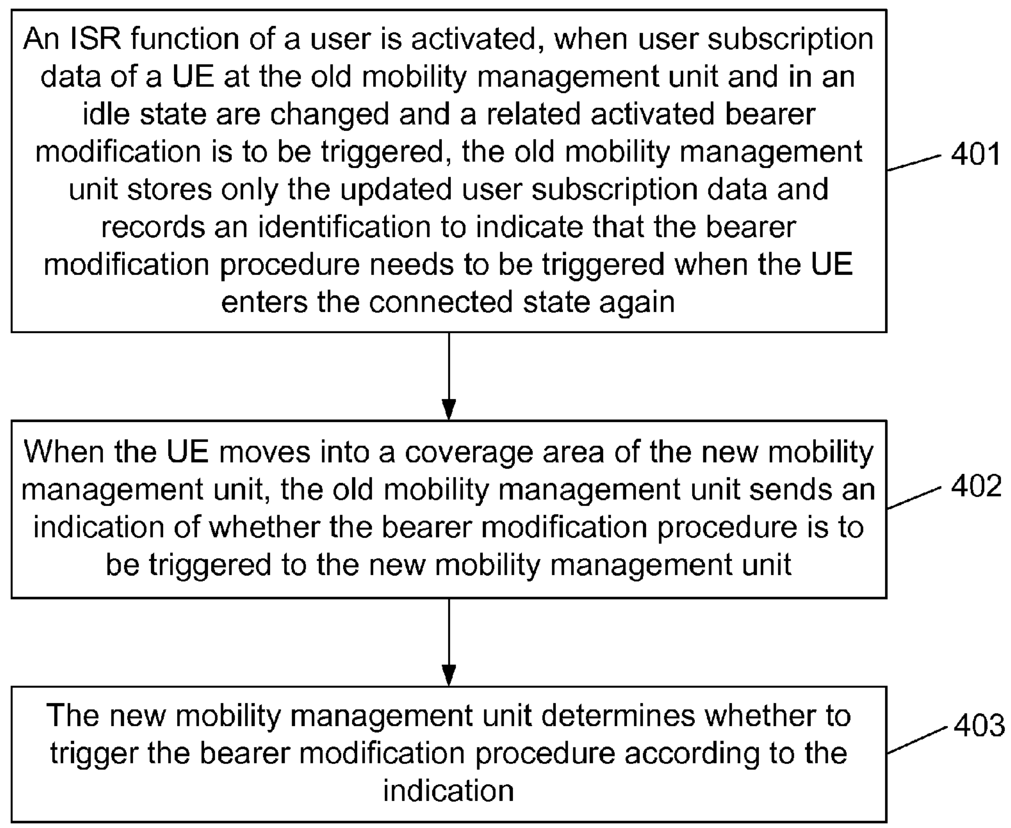
FIG. 4 shows a flowchart of a method for synchronizing user data according to the disclosure.

In order to avoid the situation that a QoS used by a bearer in the new mobility management unit does not match with a bearer QoS of an updated subscription data when a UE moves into a coverage area of a new mobility management unit, a method for synchronizing user data is provided by the disclosure; as shown in FIG. 4, the method mainly includes the following steps.

Step 401: an ISR function of a user is activated, when user subscription data of a UE at the old mobility management unit and in an idle state are changed and a related activated bearer modification is to be triggered, the old mobility management unit stores only the updated user subscription data and records an identification to indicate that the bearer modification procedure needs to be triggered when the UE enters the connected state again;

Step 402: when the UE moves into a coverage area of the new mobility management unit, the old mobility management unit sends an indication of whether the bearer modification procedure is to be triggered to the new mobility management unit; and Step 403: the new mobility management unit determines whether to trigger the is bearer modification procedure according to the indication.

It should be noted that, the old mobility management unit can send the indication of whether the bearer modification procedure is to be triggered to the new mobility management unit during a context transferring process. If the new mobility management unit determines to trigger the bearer modification procedure according to the indication, the new mobility management unit triggers the bearer modification procedure after obtaining the updated user subscription data.

Figure 5:
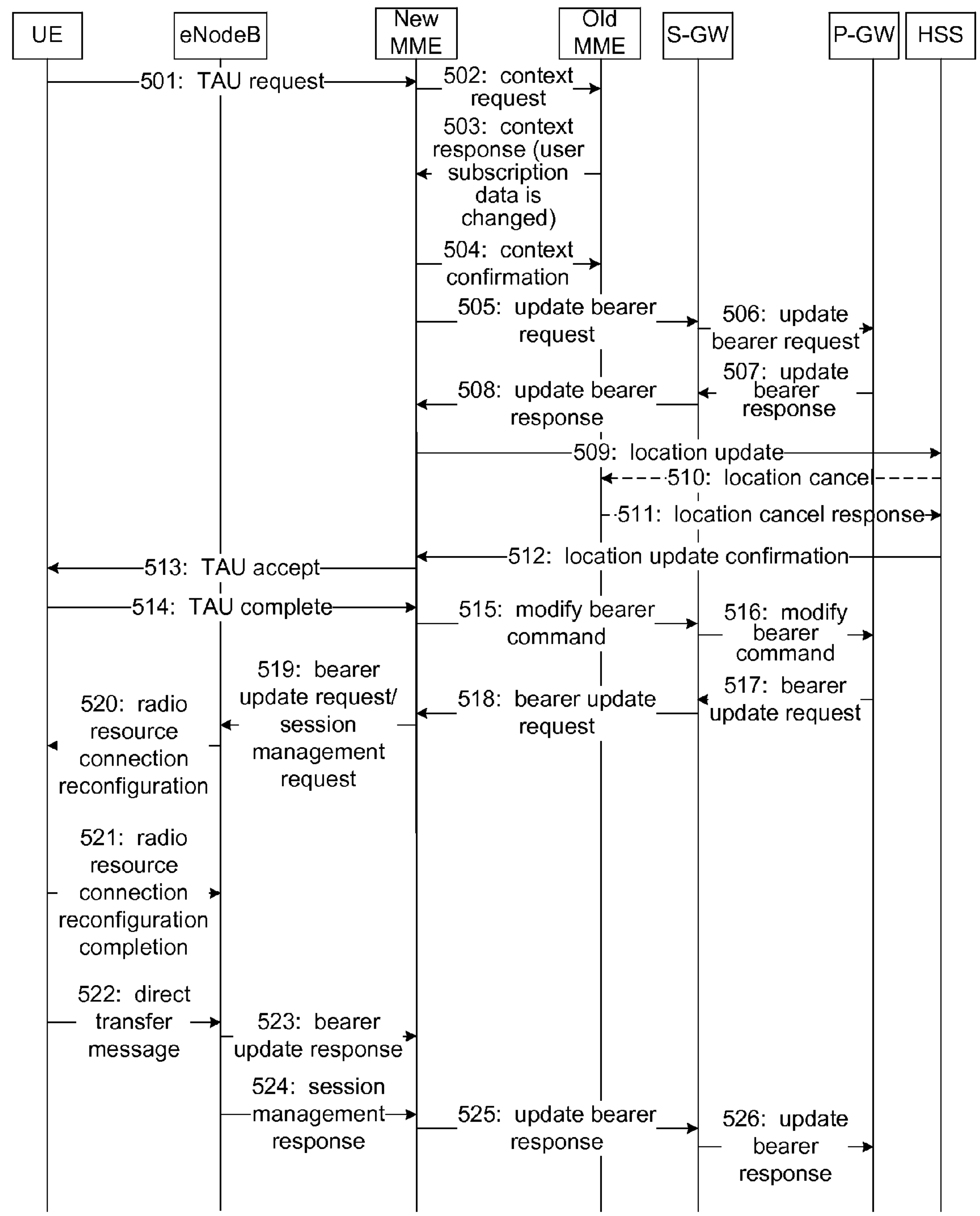
FIG. 5 shows a flowchart of a method for synchronizing user data when a UE moves into a coverage area of a new MME according to one embodiment of the disclosure.

In addition, the mobility management unit according to the disclosure can be an MME or an SGSN. The method for synchronizing the user data above will be further illustrated by taking an MME for example hereinafter. As shown in FIG. 5, in the condition that a UE moves into a coverage area of a new MME, a corresponding synchronization processing of user data mainly includes the following steps.

Step 501: the UE moves into an E-UTRAN coverage of the new MME, and sends to the MME a TAU request message. The TAU request message carries a GUTI of the UE allocated by the old MME and information on whether the UE supports the ISR;

Step 502: the new MME finds the old MME according to the GUTI and sends a context request signaling to the old MME to perform a context acquisition process;

Step 503: the old MME returns mobile management and bearer information of the user which is carried in a context response message to the new MME, wherein the context response message further carries a mark of "user subscription data are changed and a related activated bearer needs to be updated";

the mark can be expressed by a single Information Element (IE); when the UE is in the old MME and when the user subscription data are changed and the related activated bearer in the old MME needs to be updated, at the moment, the old MME needs to record the mark so that the bearer modification procedure is triggered when the UE enters a connected state again. The old MME needs to transmit the above mark to the new MME, and the old MME can notify the new MME of whether the bearer modification procedure is to be triggered based on the existence of the mark; the old MME can further instruct the new MME to need to trigger the bearer modification procedure through "1" in the IE, and instruct the new MME to not need to trigger the bearer modification procedure through "0" in the IE;

Step 504: the new MME returns a context confirmation message to the old MME;

Step 505: the new MME initiates an update bearer request to an S-GW, wherein a source GTP-C tunnel identifier, a target GTP-C tunnel identifier, a binding relationship of S-GW update bearer and UE location information are carried in the request message;

Step 506: the S-GW sends an update bearer request to a P-GW, wherein the UE location information is carried in the request message;

Step 507: the P-GW updates its own context and returns an update bearer response to the S-GW;

Step 508: the S-GW returns an update bearer response to the new MME, so as to bring to the new MME the target GTP-C tunnel identifier designated by the S-GW, an address of the S-GW itself, and an address and tunnel information of the P-GW and the like;

Step 509: the new MME notifies an HSS of location change of the UE through a location update message;

Step 510: the HSS sends a location cancel signaling to the old MME;

Step 511: the old MME returns a location cancel response to the HSS;

Step 512: the HSS confirms location update of the new MME and transmits user subscription data to the new MME;

Step 513: if the new MME confirms that the UE is valid within a current tracking area, the new MEE sends a TAU accept message to the UE;

Step 514: if the new MME allocates a new GUTI to the UE through the TAU procedure, the UE would return a TAU complete message to the MME to confirm;

Step 515: if the old MME instructs the new MME to need to trigger the bearer modification procedure in Step 503, the new MME sends a modify bearer command message to the S-GW, wherein a bearer ID, Quality of Service (QoS) of a bearer, and an Access Point Name-Aggregate Maximum Bit Rate (APN-AMBR) are carried in the modify bearer command message;

Step 516: the S-GW sends a modify bearer command message to the P-GW, wherein the bearer ID, the QoS of the bearer, and the APN-AMBR are carried in the message;

Step 517: the P-GW modifies the QoS of a related bearer and sends a bearer update request message to the S-GW, wherein the bearer ID, a modified QoS of the is bearer, and the APN-AMBR are carried in the request message;

Step 518: the S-GW modifies the QoS of the related bearer and sends a bearer update request message to the new MME, wherein the bearer ID, the modified QoS of the bearer, and the APN-AMBR are carried in the request message;

Step 519: the new MME establishes a session management request, wherein the bearer ID, the QoS of the bearer, and the APN-AMBR are included in the request; if the APN-AMBR is changed, the new MME needs to calculate a new UE-AMBR according to the APN-AMBR, and the new MME sends a bearer update request message to an eNodeB, wherein the session management request, the bearer ID, the QoS of the bearer, and the UE-AMBR are included in the request message;

Step 520: the eNodeB maps the QoS of the updated bearer to the QoS of a radio bearer, and sends a radio resource connection reconfiguration message to the UE, wherein the QoS of the radio bearer, the session management request, and a radio bearer ID are carried in the radio resource connection reconfiguration message;

Step 521: the UE sends a radio resource connection reconfiguration complete message to the eNodeB;

Step 522: the non-access stratum of the UE establishes a session management response, and sends the session management response to the eNodeB by using a direct transfer message;

Step 523: the eNodeB sends a bearer update response message to the new MME;

Step 524: the eNodeB sends a direct transfer message to bring the session management response to the new MME;

Step 525: the MME sends an update bearer response message to the S-GW; and

Step 526: the S-GW returns an update bearer response message to the P-GW.

From the flow above, when a UE moves into a coverage area of a new MME or SGSN, it can be assured that a QoS used by a bearer in the new MME or SGSN matches with a bearer QoS of an updated subscription data through a updating operation of the bearer after the new MME or SGSN obtains user subscription data.

It should be noted that, the embodiment is illustrated by taking the condition of a UE moving into a coverage area of a new MME from that of an old MME for example; for the condition that the UE moves into a coverage area of a new SGSN, the processing is method thereof is similar to the above method, thereby needing no further description here.

Corresponding to the method for synchronizing the user data above, the disclosure further provides a system for synchronizing user data, which includes: an old mobility management unit and a new mobility management unit, wherein the old mobility management unit is configured, when a UE moves into a coverage area of a new mobility management unit, to send an indication of whether a bearer modification procedure is to be triggered to the new mobility management unit; and the new mobility management unit is configured to determine whether to trigger the bearer modification procedure according to the indication.

Preferably, the old mobility management unit is further configured, when the UE moves into the coverage area of the new mobility management unit, to send the indication of whether the bearer modification procedure is to be triggered to the new mobility management unit during a context transferring process.

Preferably, the old mobility management unit is further configured, when the user subscription data of the UE at the old mobility management unit and in an idle state are changed and a related activated bearer modification is to be triggered, to store only the updated user subscription data and record an identification to indicate that the bearer modification procedure is triggered when the UE enters a connected state.

Preferably, the new mobility management unit is further configured, when determining to trigger the bearer modification procedure according to the indication, to trigger the bearer modification procedure after obtaining updated user subscription data.

The above are only the preferred embodiments of the disclosure and are not intended to limit the scope of protection of the disclosure.

The invention claimed is:

1. A method for synchronizing user data, comprising:

when a user equipment (UE) moves into a coverage area of a new mobility management unit, sending, by an old mobility management unit, an indication of whether a bearer modification procedure is to be triggered to the new mobility management unit; and determining, by the new mobility management unit, whether to trigger the bearer modification procedure according to the indication;

the method further comprising: before the UE moves into the coverage area of the new mobility management unit, when user subscription data of the UE at the old mobility management and in an idle state unit are changed and a related activated bearer modification is to be triggered, only storing, by the old mobility management unit, the updated user subscription data and recording an identification to indicate that the bearer modification procedure is triggered when the UE enters a connected state.

2. The method for synchronizing the user data according to claim 1, further comprising: when the UE moves into the coverage area of the new mobility management unit, sending, by the old mobility management unit, an indication of whether the bearer modification procedure is to be triggered to the new mobility management unit during a context transferring process.

3. The method for synchronizing the user data according to claim 2, wherein the mobility management unit is a Mobility Management Entity (MME) or a Serving General Packet Radio Service (GPRS) Support Node (SGSN).

4. The method for synchronizing the user data according to claim 1, further comprising: when the new mobility management unit determines to trigger the bearer modification procedure according to the indication, triggering the bearer modification procedure by the new mobility management unit after obtaining the updated user subscription data.

5. The method for synchronizing the user data according to claim 1, wherein the mobility management unit is a Mobility Management Entity (MME) or a Serving General Packet Radio Service (GPRS) Support Node (SGSN).

6. A system for synchronizing user data, comprising an old mobility management unit and a new mobility management unit, wherein the old mobility management unit is configured, when a UE moves into a coverage area of the new mobility management unit, to send an indication of whether a bearer modification procedure is to be triggered to the new mobility management unit; and the new mobility management unit is configured to determine whether to trigger the bearer modification procedure according to the indication;

wherein the old mobility management unit is further configured, when the user subscription data of the UE at the old mobility management unit and in an idle state are changed and a related activated bearer modification is to be triggered, to store only the updated user subscription data and to record an identification to indicate that the bearer modification procedure is triggered when the UE enters a connected state.

7. The system for synchronizing the user data according to claim 6, wherein the old mobility management unit is further configured, when the UE moves into the coverage area of the new mobility management unit, to send the indication of whether the bearer modification procedure is to be triggered to the new mobility management unit during a context transferring process.

8. The system for synchronizing the user data according to claim 7, the mobility management unit is a Mobility Management Entity (MME) or a Serving General Packet Radio Service (GPRS) Support Node (SGSN).

9. The system for synchronizing the user data according to claim 6, wherein the new mobility management unit is further configured, when determining to trigger the bearer modification procedure according to the indication, to trigger the bearer modification procedure after obtaining the updated user subscription data.

10. The system for synchronizing the user data according to claim 6, the mobility management unit is a Mobility Management Entity (MME) or a Serving General Packet Radio Service (GPRS) Support Node (SGSN).

* * * * *